H. HESS.
ANNULAR BALL BEARING.
APPLICATION FILED JULY 7, 1920.

1,371,090.

Patented Mar. 8, 1921.
2 SHEETS—SHEET 1.

WITNESS:

INVENTOR
Henry Hess
BY
Augusta B. Stoughton
ATTORNEY.

UNITED STATES PATENT OFFICE.

HENRY HESS, OF PHILADELPHIA, PENNSYLVANIA.

ANNULAR BALL-BEARING.

1,371,090.

Specification of Letters Patent. Patented Mar. 8, 1921.

Application filed July 7, 1920. Serial No. 394,578.

*To all whom it may concern:*

Be it known that I, HENRY HESS, a citizen of the United States, residing at Philadelphia, in the county of Philadelphia and State of Pennsylvania, have invented certain new and useful Improvements in Annular Ball-Bearings, of which the following is a specification.

The principal object of the present invention is to provide a self-contained annular ball bearing of maximum carrying capacity which can be assembled with a full row of balls, without radial movement of the balls, and by a relative lateral movement of the races in concentric relation with respect to the axis of the bearing, and in which the races are curved in cross-section on each side of the center line of the bearing passing through any ball normally to the axis of the bearing, and in which the annular space between the races is narrower than a ball diameter and may be practically zero.

The invention will be claimed at the end hereof but will be first described in connection with the embodiments of it chosen from other embodiments for the sake of illustration in the accompanying drawings, forming part hereof and in which—

Figure 1:
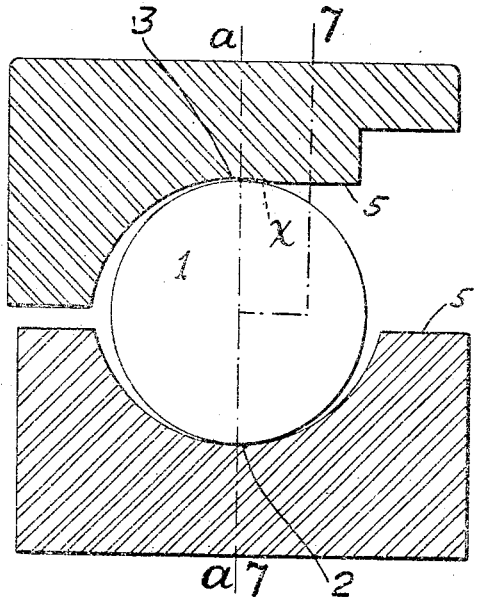
Figure 1, is a cross-sectional view taken through the two races and showing the balls in unloaded position and included in the smallest tangential circle.
Figure 2:
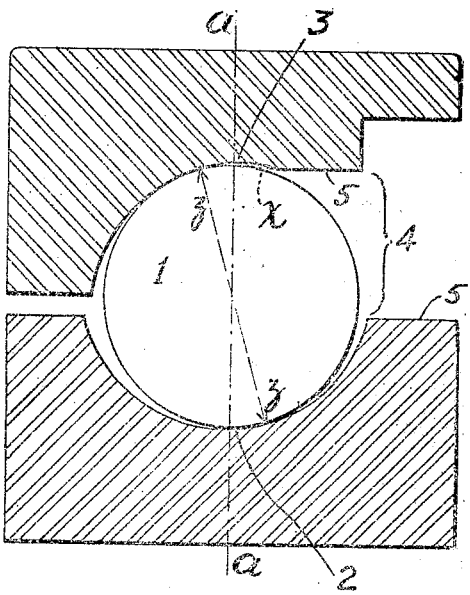
Fig. 2, is a similar view showing the balls in loaded position and included in a larger tangential circle.
Figure 4:
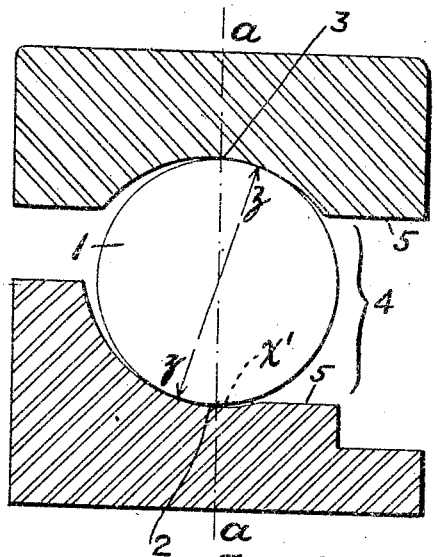
Fig. 4, is a view similar to Fig. 3, showing the balls in loaded position and in a smaller circle.
Figure 6:
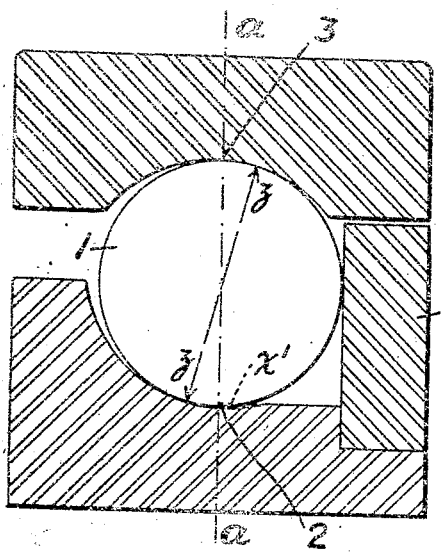
Figure 7:
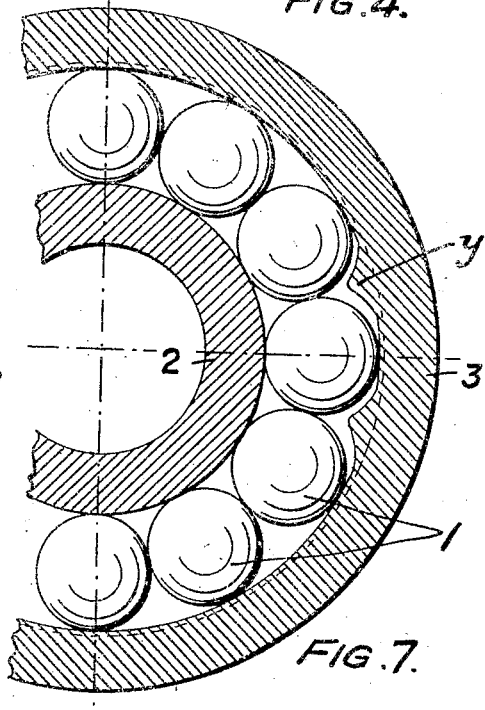

Figs. 5 and 6, are views showing a guard plate which is just clear of frictional contact and retains the balls in practically the load sustaining position of Figs. 2 and 4, and Fig. 7, is a side view of a complete bearing, partly in section on the line 7—7 of Fig. 1, but drawn to a reduced scale.

In the drawings the number of balls 1, employed is such as to form a nearly full circle of balls in the bearing. Each of the two uninterrupted annular raceways 2 and 3, is curved in cross section on both sides of a center line, as *a—a*, passing through any ball normally or perpendicularly to the axis of the bearing. The annular space 4, between the lands 5, of the races is narrower than a ball diameter and may be practically zero. In Figs. 1 and 2, the annular space is bounded toward the periphery of the bearing by a circle corresponding with or slightly smaller than the smallest tangential circle that includes the balls, and when included in that circle the balls are at the bottom of the curve of the cross section of the race way 2, as shown in Fig. 1, and the balls are in unloaded position. The line *x*, is applied in Fig. 1, to illustrate this and to show that when the pitch circle of the balls is as small as the lowest part of the groove of the inner raceway permits, the annular assembly space is bounded at the outer raceway by a circle concentric with a circle tangential to the balls in that position and of the same or slightly smaller diameter. The diameter of the circle which bounds the annular space at the inner raceway is not material so long as a land is provided that will make the annular space materially narrower than a ball diameter.

Figure 3:
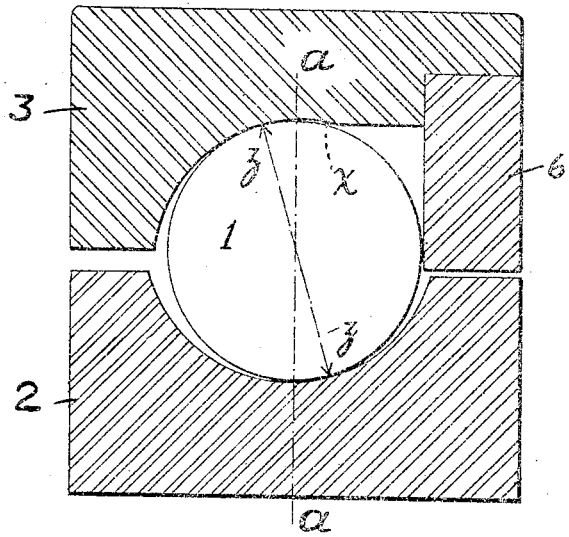
Fig. 3, is a view similar to Fig. 1, of a modification and showing the balls in unloaded position and included in the largest tangential circle.
Figure 3:
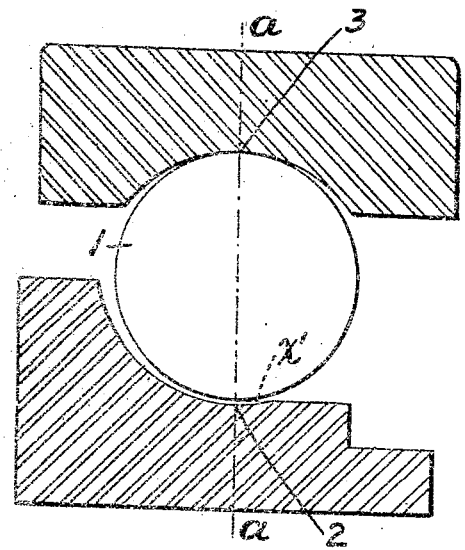

In Figs. 3 and 4, the annular space is bounded at the inner raceway by a circle of the same diameter as a circle tangent to the balls, near the inner raceway, when the balls are in the highest part of the groove in the outer raceway and this is indicated by the line *x'* applied to those figures, and in this case the diameter of the circle bounding the annular space at the outer raceway is not material so long as a land is provided that will make the annular space materially narrower than a ball diameter. It may be said that the construction of Figs. 1 and 2, and Figs. 3 and 4, are merely reversals of each other. In the case of either Figs. 1 or 3, in which the balls are in extreme radial position, *i. e.* arranged in the smallest pitch circle, Fig. 1, or largest pitch circle, Fig. 3, permitted by the low part of the groove in the inner raceway, Fig. 1, or in the outer raceway, Fig. 3, the bearing can be assembled or disassembled by first positioning the balls in such extreme radial position and then bringing the raceways into confronting position by moving them relatively sidewise while concentric with the axis of the bearing. When loaded the horizontal thrust or vertical load gives a resultant load along *z—z*, which causes the balls to occupy a pitch-circle intermediate of the extreme pitch circles, Figs. 2 and 4, and therefore the circle tangent to the balls is larger than the circle bounding the annular assembly space 4, so that the balls cannot escape from the raceways.

The true circular form can be departed from, by leaving projections, as at $y$, Fig. 7, in the annular space between the walls of which the balls may pass to place. 6, is a guard plate which positively prevents disassembly of the bearing even when unloaded and it is not intended to play any special part when the bearing is loaded, although it may be just short of frictional contact with the balls. When the bearing is not loaded, it may serve to keep the balls from assuming the positions shown in Figs. 1 and 3.

It will be obvious to those skilled in the art to which the invention relates that modifications may be made in details of construction and arrangement without departing from the spirit of the invention which is not limited to such matters or otherwise than as the prior art and the appended claims may require.

I claim:

1. An annular ball bearing containing any number of balls up to a substantially full circle of balls and in which each of the two raceways is curved in cross section on both sides of a center line passing through any ball normally to the axis of the bearing and in which the annular assembly space between the lands of the races is bounded by a circle tangent or nearly tangent to balls in extreme radial position in respect to the axis of the bearing, whereby assembly is effected by movement of one race over the balls, substantially as described.

2. An annular ball bearing comprising inner and outer uninterrupted raceways each curved in cross-section on both sides of a center line passing through any ball normally to the axis of the bearing, and a number of balls up to a substantially full circle of balls introducible when in extreme radial position in respect to the axis of the bearing between the races through space provided between the races and bounded by a circle commensurate with a circle tangent or nearly tangent to the balls when in such extreme radial position and not passable through said space when in other radial positions corresponding to load.

3. An annular ball bearing comprising in combination inner and outer rings having opposed continuous grooved raceways, and a circle of balls in the grooved raceways and adapted to occupy extreme radial positions therein corresponding to load and no load, the land of one of said raceways being adapted to pass over the balls assembled in the other raceway under no load and not under load, substantially as described.

4. An annular ball bearing containing any number of balls up to a substantially full circle of balls and in which each of the two raceways is curved in cross section on both sides of a center line passing through any ball normally to the axis of the bearing and in which the annular assembly space between the lands of the races is materially narrower than a ball diameter and in which one land is spaced in respect to the opposite raceway to pass the balls in unloaded position only.

5. An annular ball bearing containing any number of balls up to a substantially full circle of balls and in which each of the two raceways is curved in cross section on both sides of a center line passing through any ball normally to the axis of the bearing and in which the annular assembly space between the lands of the races is materially narrower than a ball diameter and in which one land is spaced in respect to the opposite raceway to pass the balls in unloaded position only and which is provided with a guard plate attached to one of the races, substantially as described.

HENRY HESS.